Dec. 13, 1955     K. W. MacKENZIE     2,726,730
GAS CLEANING DEVICE Filed June 16, 1949     8 Sheets-Sheet 1

FIG. 1

INVENTOR
KENNETH W. MacKENZIE
BY
ATTORNEY

Dec. 13, 1955 K. W. MacKENZIE 2,726,730
GAS CLEANING DEVICE
Filed June 16, 1949 8 Sheets—Sheet 2

INVENTOR
KENNETH W. MACKENZIE
BY
ATTORNEY

Dec. 13, 1955 K. W. MacKENZIE 2,726,730
GAS CLEANING DEVICE
Filed June 16, 1949 8 Sheets—Sheet 3

FIG. 3

INVENTOR
KENNETH W. MACKENZIE
BY
ATTORNEY

Dec. 13, 1955  K. W. MacKENZIE  2,726,730
GAS CLEANING DEVICE
Filed June 16, 1949  8 Sheets-Sheet 4

INVENTOR
KENNETH W. MACKENZIE
BY
ATTORNEY

INVENTOR
KENNETH W. MACKENZIE
BY
ATTORNEY

United States Patent Office 2,726,730
Patented Dec. 13, 1955

2,726,730
GAS CLEANING DEVICE

Kenneth W. MacKenzie, Newton Highlands, Mass., assignor, by mesne assignments, to APRA Precipitator Corporation, New York, N. Y., a corporation of Delaware Application June 16, 1949, Serial No. 99,461

6 Claims. (Cl. 183—7)

This application relates to the precipitation of particulate matter in gases upon charged electrodes, and more particularly to a system whereby large quantities of heated gas may be efficiently freed from particulate matter.

It has been found that flue gas from furnaces contains chemicals which upon cooling to a temperature substantially below 600° F. will combine with particles in the gas to form corrosive acids. If flue gas is cooled by passing the same through a heat exchanger which may be used, for example, to heat incoming air supplied to the furnace, the corrosive acids produced by the flue gas during this cooling process will attack the metallic portions of the heat exchanger thereby substantially reducing the effective life of the same. In order to reduce the corrosive action of flue gas components on heat exchangers and other equipment, such as ducting and blowers, it becomes desirable to precipitate any particulate matter in the flue gas before the flue gas is cooled to below 600° F. This may be accomplished by passing the flue gas directly from the furnace through an electronic precipitator.

Since this precipitator must operate at high temperatures, for example, in the range of 600°–1100° F., provision must be made for a device which will have sufficient heat resistance and mechanical strength at those high temperatures.

Furthermore, it has been found that, by making the precipitator in the form of a prism with the individual precipitating sections forming longitudinal elements of the prism, each of the sections of the precipitator may be successively cleaned by producing a rotation between the cleaning system and the prism of the precipitator about the axis of said prism.

It is to be clearly understood that this relative motion may be accomplished by maintaining the precipitator prism stationary and moving the cleaning system. However, as is more desirable, and as provided herein, the precipitating prism is rotated such that successive sections are in turn moved into registration with ducting whereby flue gas is fed to those sections. By this system the sections through which flue gas is not being passed at any particular time may be passed through an area where they will be subject to cleaning by any desired system.

While the modification shown herein is a prism having eight sides, it should be clearly understood that the term prism as used herein is generic to parallelepipeds having any number of sides as well as to cylinders. Successive sections are then rotated past the ducts carrying the flue gas and then past apparatus for cleaning the sections.

Since the sections of the precipitator only require high voltage during the time that they are being fed flue gas, means are provided herein for successively deenergizing the sections during the time when they are not in the flue gas region and during this deenergized time the sections are cleaned and may be removed and replaced by substitute sections if a defect, such as a flashover, has occurred in any section.

Since portions of the precipitator unit operate at potentials in excess of 15,000 volts, it is necessary to support said portions by means of insulators. Since insulators have a tendency to deteriorate and crack at high temperatures, it is desirable to have a means for cooling said insulators to a practical operating temperature and also to maintain said insulators free from deposits of particulate matter from the gas. Both of these purposes may be accomplished by blowing air over the insulators in a novel manner described hereinafter.

Therefore, it is an object of this invention to provide a rotating dust precipitator wherein sections are successively passed into a precipitating area and then passed into a cleaning area.

A further object of this invention is to provide for a rigid structure for said precipitator unit which will operate at high temperatures.

A still further object of this invention is to provide means for successively deenergizing sections of the precipitating unit not in the area of the flue gas.

Still another object of this invention is to provide means for insulatedly supporting portions of the precipitator unit which must be maintained at high potentials by the use of insulators and means to maintain said insulators free from deposits of particulate matter and at a temperature below that occurring during operation of the precipitating unit.

Other and further objects of this invention will become apparent as the description thereof progresses, reference being had to the accompanying drawings wherein.

Figure 1:
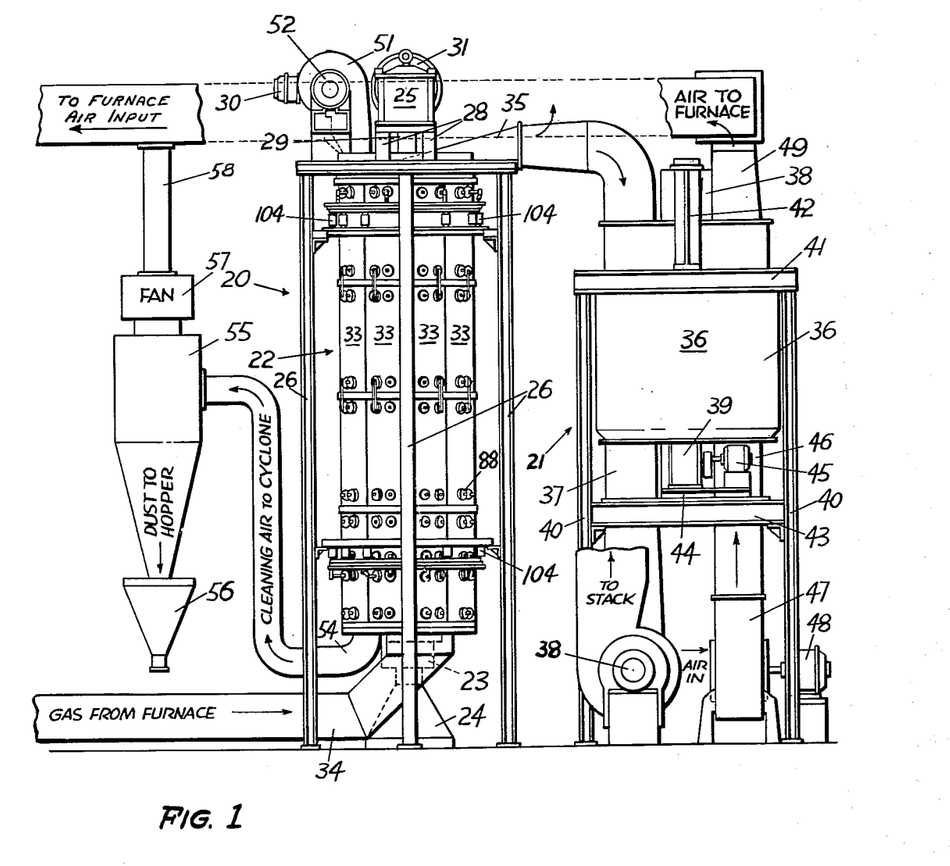
Fig. 1 represents a front elevation view of a system utilizing this invention.
Figure 2:
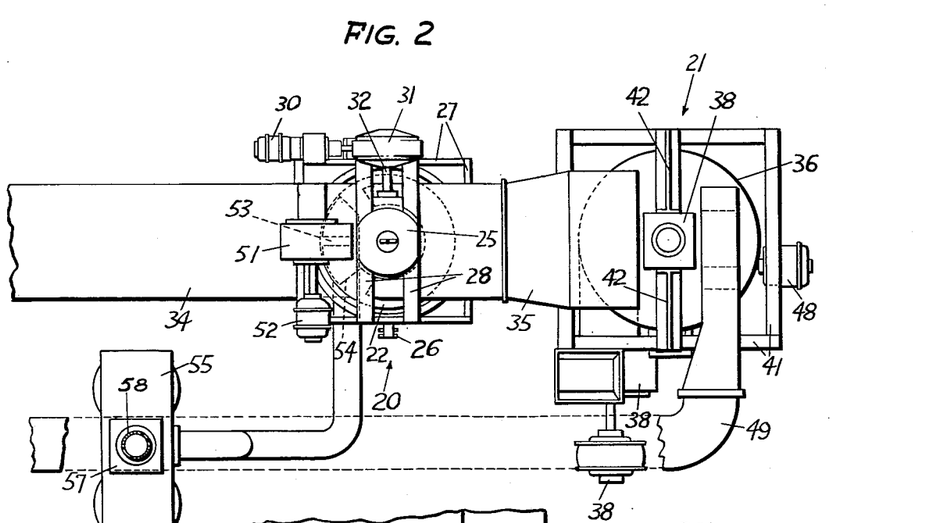
Fig. 2 represents a top plan view of the system shown in Fig. 1.

Referring now to Figs. 1 and 2, there is shown a complete system for taking gas from a furnace, precipitating particulate matter from said gas, and passing the gas through a heat exchanging apparatus. This system comprises broadly two units, a precipitating unit 20 and a heat exchanging unit 21. The precipitating unit comprises a vertical rotating prism 22 supported at its lower end by a thrust bearing 23 mounted on a supporting base 24. The upper end of the rotating prism 22 is held by a bearing 25 which is in turn rigidly attached to a supporting framework. The supporting framework, shown here by way of example, consists of a plurality of upright members 26 resting on the ground level and whose upper ends are attached to a square-shaped hollow box frame by any suitable means as, for example, by welding or by riveting. The box frame consists of four side members 27, sufficiently large such that the rotating prism 22 falls within the space defined by the box frame members 27 and the upright 26.

Extending across the box frame from two of the opposite side members 27 is a pair of steel beams 28 which pass one or either side of the bearing 25 and are rigidly attached thereto. The bearing 25 engages a shaft 29 rigidly attached to and extending along the axis of the prism 22. The housing of bearing 25 contains therein suitable gearing means whereby motion may be imparted to the prism 22. This motion is supplied by a motor 30 which drives a speed reducing mechanism 31 of any desired type, such as a worm drive. Speed reducer 31 has extending therefrom a shaft 32 which extends into the bearing house 25 and is connected by said suitable gearing, for example, by beveled gears through the shaft 29 to the rotating prism 22. Thus it may be seen that the rotation of motor 30 produces a rotation of the prism 22, the speed of rotation of said prism being any desired amount such as, for example, 3 R. P. M.

Figure 4:
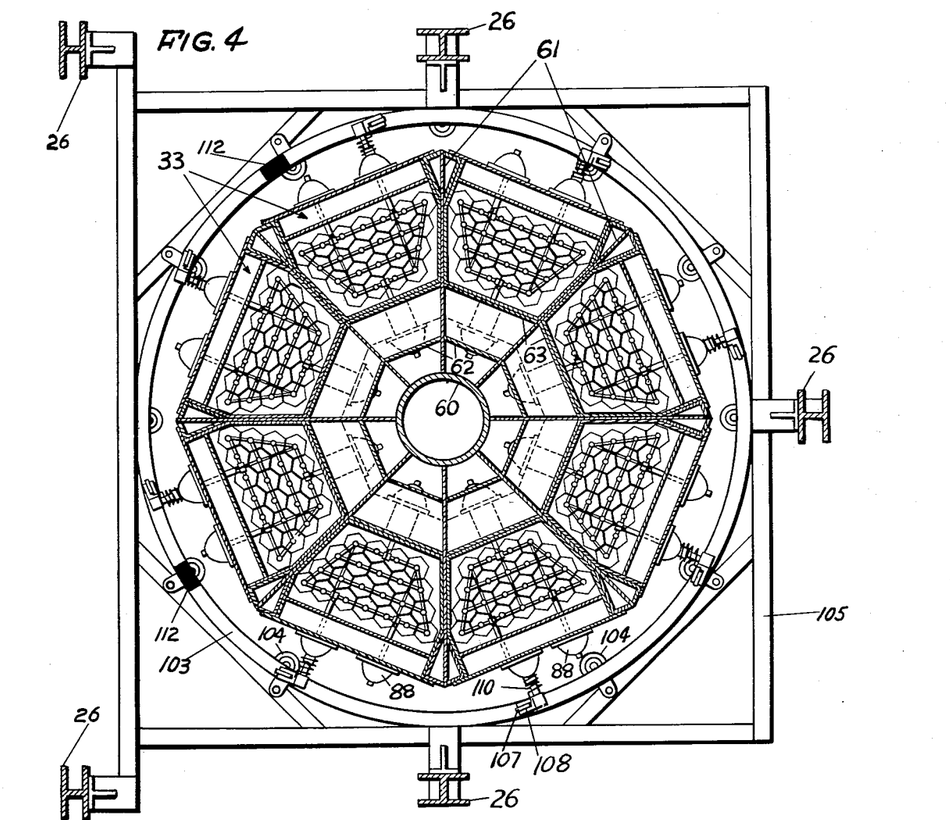
Fig. 4 represents a cross-sectional view of the precipitating unit shown in Fig. 3 taken along line 4—4 of Fig. 3.

The rotating prism 22 is divided into a number of equally sized longitudinal sections 33 having a pie-shaped cross-sectional area. As shown in Fig. 4 there may be, for example, eight sections. These sections are separated from each other by partitions running the length of the prism 22 so that gaseous material in one section may not pass into another section. Each of these sections comprises a complete precipitating unit, the details of which will be more completely described hereinafter.

The prism 22 is open at both ends and registers with ducting in the following manner. At the lower end of the prism a predetermined number of the sections, for example, five of the eight, simultaneously register with a duct 34 whereby gas, containing particulate matter to be precipitated, is passed into the precipitating sections from any desired source, such as a furnace. The upper end of the five sections of prism 22 which are at any one time registering with the duct 34 registers with a duct 35 having substantially the same shaped opening facing the open ends of the sections as does the duct 34, said shape being substantially the same as the shape of the cross section of the five sections in registry with said ducts. The duct 35 feeds cleaned gas from the precipitating prism 22 to the heat exchanging unit 21.

Cylinder 36 is supported by upper and lower bearing members 38 and 39, respectively, said bearing members being supported by any desired means, such as a frame. As shown the supporting frame comprises four upright members 40 attached to an upper box frame comprised of members 41 similar to that made up of members 27 in the precipitating section. A pair of yoke members 42 extends from two of the opposite sides of box frame 41 to the upper bearing member 38 rigidly supporting the same. A second box frame comprising members 43 is positioned on the upright members 40 below the rotating cylinder 36 and supports, by means of a cross member 44, the lower bearing 39 of the cylinder 36.

The lower bearing contains therein appropriate gearing for driving the rotor 36 by means of a motor 45 supported by the box frame members 43. This drive may be of any desired type, such as the one described as connecting the motor 30 to the precipitating cylinder shaft 29. The heat, abstracted from the flue gas as it passes through cylinder 36, is used to heat incoming air fed into cylinder 36 by incoming air ducts. The incoming air ducts comprise an input air duct 46 registering with the bottom of cylinder 36, air being forced through said duct into the cylinder 36 by means of a fan 47 driven by an electric motor 48. The upper end of that portion of the cylinder 36 whose lower end registers with duct 46 registers with an output duct 49 from whence the air heated by passing through the cylinder 36 is fed to any desired device, such as the air intake of a furnace.

Thus it may be seen that hot gases may be drawn from a furnace through a precipitating unit and a heat exchange device and then driven out an exhaust stack and the heat given up by said gas in said heat exchanger used to heat incoming air for use in the furnace. By the use of this system particulate matter in the gas from the furnace, which would combine with chemicals in the flue gas upon the cooling thereof to form corrosive acids, are first removed from the gas prior to cooling gas by the heat exchange apparatus with the result that the production of corrosive acids is substantially reduced.

In order to clean the precipitated matter off the plates of the precipitator sections, a cleaning gas is forced through the sections of the precipitating prism 22 during the time when they are not within the area in registry with the gas ducts 34 and 35. To accomplish this, blower 51 forces the gas at high velocity through a nozzle 53 so positioned that due to the rotation of the prism 22 it comes successively in registry with the upper end of all portions of each section of the precipitating cylinder. The gas emitted from nozzle 53 is thereby forced through the sections 33 as they come in registry therewith at a sufficient velocity to blow off particulate matter which has been deposited on the walls of the precipitating sections. Due to the agglomerating action of the precipitator the particulate matter blown from the precipitating unit is substantially larger in size than was the particulate matter in the gas from the furnace. Gas blown from the nozzle 53 along with the particulate matter blown off the sides of the precipitating sections is collected at the bottom of the prism 22 by a duct 54 in registry with the sections being cleaned. This duct 54 feeds the gas and particulate matter into a cyclone 55 of any well-known type which acts as a centrifuge to separate the particulate matter from the gas, the particulate matter dropping down into a hopper 56 and the gas being exhausted from the cyclone 55 by a fan 57 which blows the gas through a duct 58 into the air intake duct which feeds the air input by forced draft to the furnace.

Due to the fact that the cleaning nozzle operates on only one section of the precipitator unit at a time, the gas required to clean the precipitator unit is a small percentage, for example, on the order of 5% of the total gas being cleaned by the precipitator unit. Hence, since cyclone 55 handles only a small fraction of the total gas handled by the precipitator, for example, 1/20 thereof, the cyclone 55 need be only 1/20 as large as a cyclone which would handle the entire volume of flue gas being cleaned by the precipitator. Furthermore, if all the flue gas were cleaned by a cyclone instead of a precipitator, much of the smaller particulate matter would not be separated from the gas.

Obviously, many types of cleaning nozzles could be used in place of the nozzle 53, said nozzles being either movable or stationary.

Figure 3:
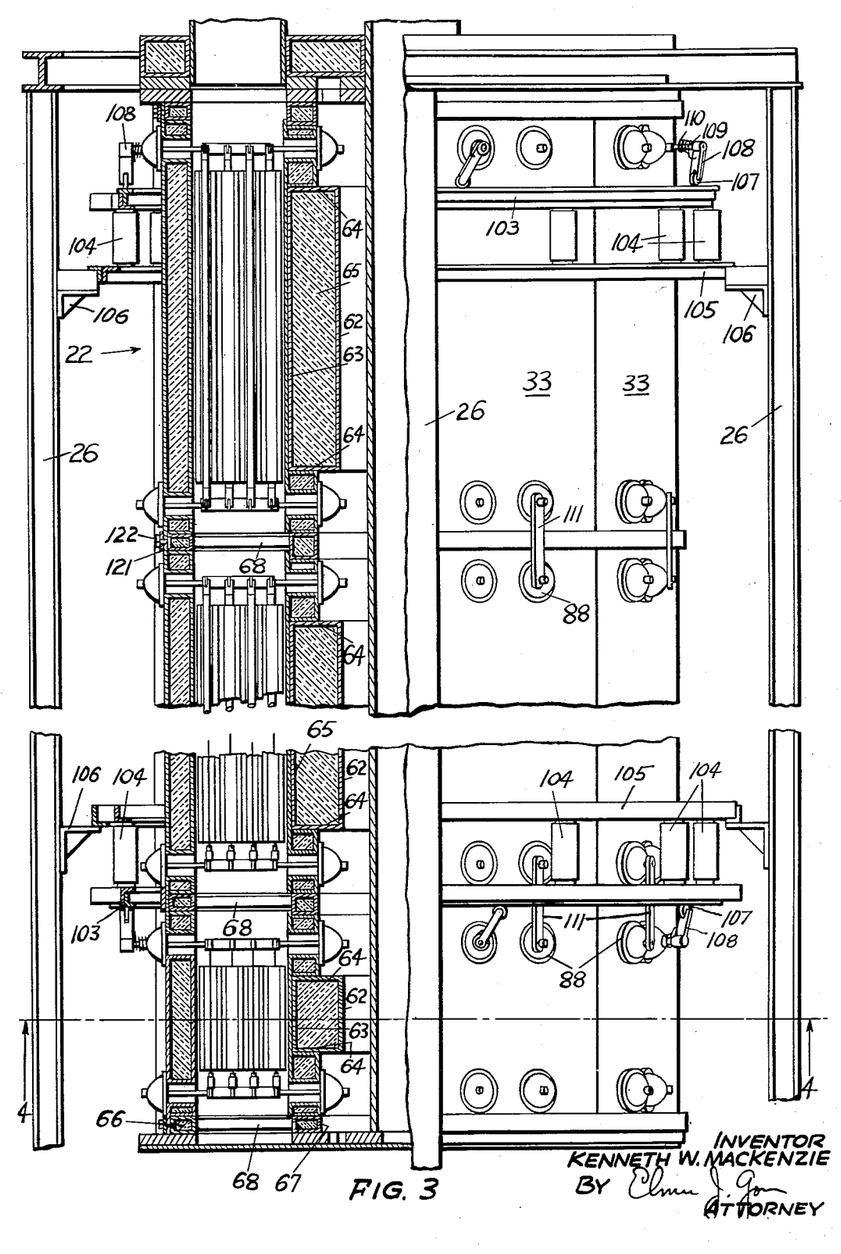
Fig. 3 illustrates a partially broken away front elevation view of the precipitating unit showing details of the assembly of the sections and a system for applying high voltage to the electrodes of the precipitating unit.

Referring now to Figs. 3 and 4 there is shown the details of one modification of the precipitator unit 20. This unit comprises the rotating prism 22 made up of eight pie-shaped sections 33. Each of these sections 33 is made up of a plurality of tiers stacked one above the other to make the pie-shaped section. As shown more clearly in Fig. 1, this particular modification uses five tiers per section. The lower two tiers of each segment are shown here as ionizer sections while the upper three are collector sections.

By the use of separate tiers for the ionizing and collecting sections, different voltages may be applied between the electrodes in the ionizing section than are applied between the electrodes in the collecting sections. Because of this feature, both the ionizing and collecting sections may be operated at their optimum voltages, neither being limited in operation by the voltage or structural configuration of the other. Because the collecting sections may be operated at their optimum voltages, gas containing charged particulate matter therein may be passed through these sections at a greater rate of speed than was previously believed feasible with the result that a greater quantity of gas may be cleaned by this precipitator unit than has heretofore been possible in other units of comparable size. Furthermore, by operating the collecting sections at their optimum voltage, said voltage being just below that required to break down the space between the electrodes, particulate matter of very small size, for example, on the order of 1–3 microns, may be collected. In previously designed precipitator units these small particles were normally not precipitated from the gaseous medium, but, by the use of a precipitator designed in accordance with this invention, particulate matter of small size, on the order of 1–3 microns, will be, to a high degree, on the order of 80–90% precipitated.

One form of the collecting section electrodes, the details of which are more completely described hereinafter, comprises a hollow prismatic conductor and a central conductor positioned coaxially inside said prismatic conductor. The central conductor is a cylinder of substantial diameter. By the use of a central conductor which is a cylinder of substantial diameter, a higher potential gradient may be produced in the space between said central cylinder and the outer prismatic electrode without breaking down the gas therebetween than would be possible if the central conductor had a small diameter being, for example, a thin wire. On the other hand, however, in the ionizing sections a thin wire is used for the central conductor whereby a substantial ionizing current is caused to flow in the gaseous media passing through the ionizing section by the use of a potential between the ionizing electrodes that is smaller than would be required if the central conductor had a relatively large diameter. Thus it may be seen that by the use of a plurality of tier sections a greater flexibility of design is permitted whereby a more efficient precipitator may be produced.

These sections are removably positioned in a framework constructed as follows. At the center of the prism 22 is a hollow cylindrical member 60 extending the length of the prism 22 into the upper and lower bearings 23 and 25 to thereby support said prism 22. Extending radially outwardly to the periphery of prism 22 from cylinder 60 and rigidly attached thereto as by welding is a plurality of sheet metal planar members 61. These members 61 extend the length of prism 22 thereby effectively dividing prism 22 into the plurality of sections 33 heretofore referred to. A plurality of planar stiffening members 62 extends between adjacent members 61 a short distance outward from the hollow cylinder 60, said members 62 being positioned parallel to the axis of cylinder 60 thereby forming an octagonal configuration. The members 62 do not extend continuously the entire length of prism 22 but are positioned in sets at discrete intervals along the length of prism 22 where they will not interfere with equipment placed in the various sections. A second set of stiffening members 63 occurs in a similar configuration to that of members 62 a short distance farther out from the cylinder 60 than the members 62 and at the same discrete intervals along the length of prism 22. These stiffening members are flat sheet metal planar members whose planar surfaces are parallel to the axis of cylinder 60. The free edges of the members 62 are connected with the adjacent edges of member 63 by short, planar members 64 perpendicular to the members 62 and 63 thereby in cooperation with the radial members 61 forming a complete enclosure. The spacing closed by these members is filled with heat insulating material 65 whereby heat is prevented from passing from the precipitator sections outside of the member 63 in toward the center cylinder 60.

The tiers of each section are supported in the following manner. At the outer edge of prism 22 below each tier there is a member consisting of an annular ring 66 of the same diameter as prism 22 and concentric therewith. This annular ring has a cross-sectional area which is rectangular in shape, being made up of sheet metal members, and, therefore, hollow in the inside. The hollow space is filled with insulating material 65. This ring 66 is rigidly attached to the radial members 61 thereby preventing the movement at their outer ends in a direction tangential to prism 22. A ring 67, smaller in diameter than ring 66 but similar thereto, is positioned concentric with the axes of prism 22 at points along the axis of prism 22 such that they will support the inner edges of the tiers. Extending radially between rings 66 and 67 is a plurality of support member 68, such as angle irons, whose top surface corresponds with the top surface of the rings 66 and 67. These members 68 are attached as by welding to the radial members 61. By this structure the tiers which are removable may slide in and out on the supporting members comprising the rings 66 and 67 and support member 68. Thus it may be seen that there is provided a supporting frame for the various tiers of the precipitating section in the rotating prism 22.

As previously mentioned, the tiers are of two types, those used for ionizing the gas and charging the particulate matter therein of which the lower two tiers shown in Fig. 1 are comprised, and those which are used for collecting the particulate matter on metallic surfaces as shown by the upper three tiers of Fig. 1.

Figure 7:
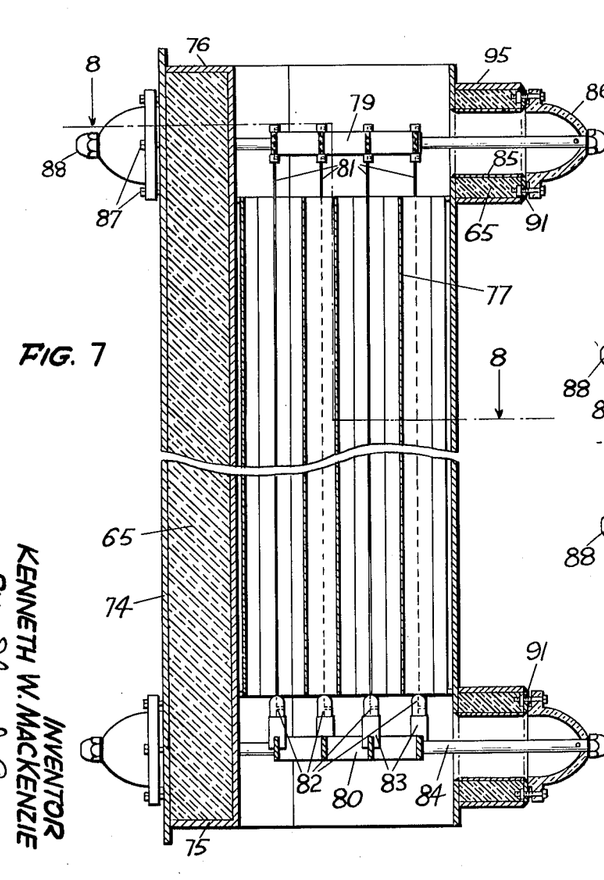
Fig. 7 is a longitudinal cross-sectional view of a single section of the precipitating unit used for ionizing the gas and the particulate matter therein taken along line 7—7 of Fig. 8.
Figure 8:
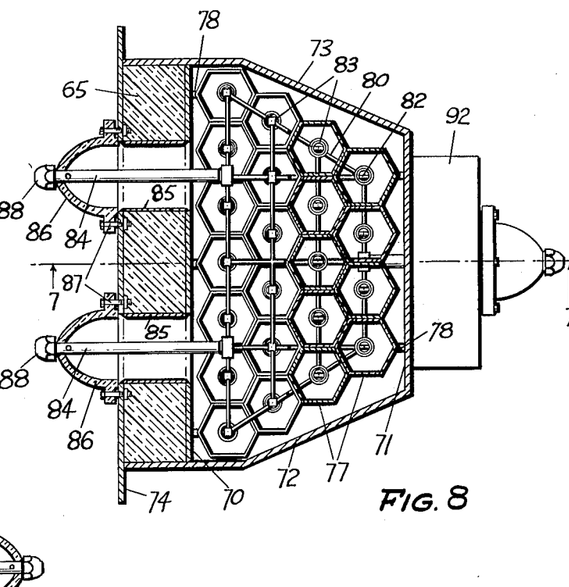
Fig. 8 is a transverse cross-sectional view of the section shown in Fig. 7 taken along line 8—8 of Fig. 7.

Referring now to Figs. 7 and 8 there is shown an ionizing tier section. This removable unit comprises generally a box-like device open at both ends having a substantially trapezoidal cross-sectional area wherein are contained the ionizer electrodes. The trapezoidal shape is the result of the truncation of the pie shape of the section 33 described in connection with Figs. 1–4. The trapezoidal-shape open-ended box comprises 4 metallic sheets welded together. Two of the opposite sides 70 and 71, which are parallel, form the upper and lower bases of the trapezoid. The remaining two members 72 and 73 form the sides of the trapezoid. At a point adjacent the longer base member 70 the members 72 and 73 are bent such that they become parallel to each other and extend outward beyond member 70 to a second plate 74 which makes up the outer cover plate of each tier. As shown in Fig. 7 the space between the ends of the base member 70 and the outer member 74 is closed by metallic planar members 75 and 76 thereby enclosing the space between plates 70 and 74 and side members 72 73, this space being filled with heat insulating material 65. The trapezoidal space defined by members 70—73 is filled with a plurality of hexagonal, hollow prisms 77 whose axes are perpendicular to the trapezoidal cross section of the unit. These prisms 77, which are made up of metallic sheet members, lie parallel to each other, their adjacent sides being attached to each other as by welding and the points of said prisms 77 adjacent the sides of the trapezoidal members 70—73 being attached thereto by welded tabs as at 78. The prisms 77 do not extend the entire length of the box-shaped member but leave a substantial space at each end, for example, a distance equal to approximately twice the distance of the longest cross-sectional dimension of one of the prisms 77. The space left at the ends of the box member contains a grid structure 79 and 80 at the upper and lower ends of the prisms 77, respectively.

The upper grid structure 79 supports a plurality of wires 81, each of which extends along the axis of a prism 77 to the lower grid structure 80. The wires 81 are maintained in axial relationship with the cylinder 77 by a system of weight members 82 attached to the lower ends of the wires 81, said weight members being restrained in movement transverse to the axis of prisms 77 by guide members 83 attached to the lower grid 80. The details of the wire attachment and guiding action of the weights are more completely described in copending application Ser. No. 98,037, now abandoned.

The grid structures 79 and 80 are each supported by a set of insulators as follows. The grid structure 79, for example, is connected to three rods 84, two of which extend outwardly through plates 70 and 74 at points spaced from the sides 72 by a distance equal to approximately twice the longest cross-sectional dimension of the prisms 77. The holes in plates 70 and 74 are connected by cylinders 85 surrounding the rods 84 such that the space defined by the members 70, 72, 73, 74, 75 and 76 still remains a closed space containing heat insulating material. Extending outwardly from the outer surface of the member 74 are bell-shaped insulators 86, the mouths of the bell-shaped insulators covering the holes in plate 74 through which the rods 84 pass. These bell-shaped insulators are secured to the plate 74 by any desired means, such as bolts 87. Rods 84 extend through holes in the tops of the bell-shaped insulators 86 and are firmly clamped against the outside of the tops of the insulators by nuts 88.

Figure 13:
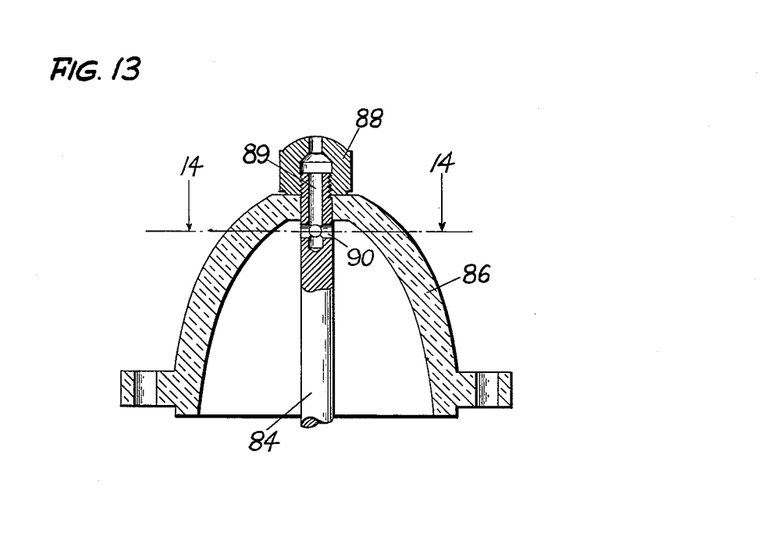
Fig. 13 illustrates a partially broken away longitudinal cross-sectional view of the insulating support shown in Figs. 7–12 taken along line 13—13 of Fig. 14.
Figure 14:
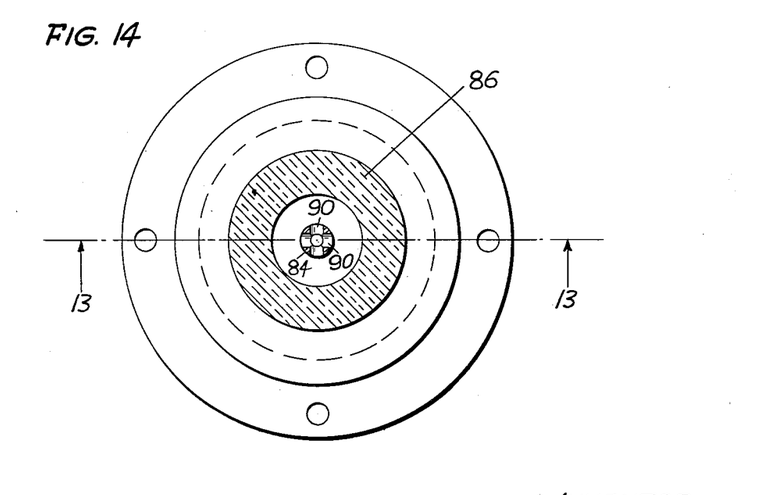
Fig. 14 represents a transverse cross-sectional view of the insulating support shown in Fig. 13 taken along line 14—14 of Fig. 13.

As shown in more detail in Figs. 13 and 14, the rods 84 and the cap nuts 88 are drilled axially and concentrically with the rods 84 inwardly from the outer ends of rods 84 to a point somewhat inside the insulators 86. The diameter of this drilled hole 89 is approximately one-half the diameter of the rod 84. At the inner end of the hole 89 crossed holes 90 are drilled through the rod 84 perpendicular to the axis of rod 84 and hole 89 thereby intersecting hole 89.

Since the entire precipitator system operates at below atmospheric pressure due to action of exhaust fan 38, air will be sucked in from outside the insulator 86 through hole 89 and the crossed holes 90, said air thereby impinging on the inner wall of the bell-shaped insulator 86. This air accomplishes two purposes. First, it cools the insulator 86 and, second, it blows off any particulate matter which may have deposited on the inner surface of insulator 86 thereby preserving the insulating properties of the insulator 86.

The rod 84 which extends outwardly through plate 71 passes through a cylinder 85 in a manner similar to that of the rods 84 extending outwardly through plates 70—74. The rod 84 extends through a second plate 91 spaced from plate 71 by a distance approximately equal to the spacing of plates 70 and 74, said plate 91 having a hole therein equal in diameter to the hole in plate 71 for the passage of rod 84 therethrough and the cylinder 85 being connected as by welding between the holes in plates 71 and 91. The rod then extends through an insulator 86 attached to plate 91 in a manner similar to that previously described. The plate 91 extends in a direction parallel to the axes of the prism 77 for a distance slightly greater than the insulator 86. The plates 91 extend in a direction perpendicular to the axes of the prisms 77 for a distance which may be such that, if the side plate 72 were extended, they would intersect at plates 91. This structure is fabricated for convenience and the sides 72 could extend to intersect with the plates 91. However, in the present structure the space between the edges of the plates 91 and the plate 71 are connected by plate members 92 thereby boxing in the cylinder 85, the space between the cylinder 85 and the box formed by members 95, plate 91 and 71 being filled with insulating material 65.

The space between the upper and lower boxes made by members 95 is such that, when the tier is put into the prism 22, said space registers with the enclosure formed by stiffening members 62, 63 and members 64 previously described. When the tier is inserted in the cylinder 65, the lower surface of the member 75 at the lower end of member 70 registers with the upper surface at the supporting ring 66. The lower edge of the members 72 and 73 rests on supporting members 68, and the lower edge 95 of the lower box surrounding cylinder 85 rests on the upper surface of inner ring 67. Correspondingly, the upper surface of the upper member 76 contacts the lower surface of the next higher supporting ring 66 and the upper surface 95 of the box member surrounding the upper cylinder 85 connected to inner plate 91 contacts the next higher inner support ring 67.

Figures 9, 10:
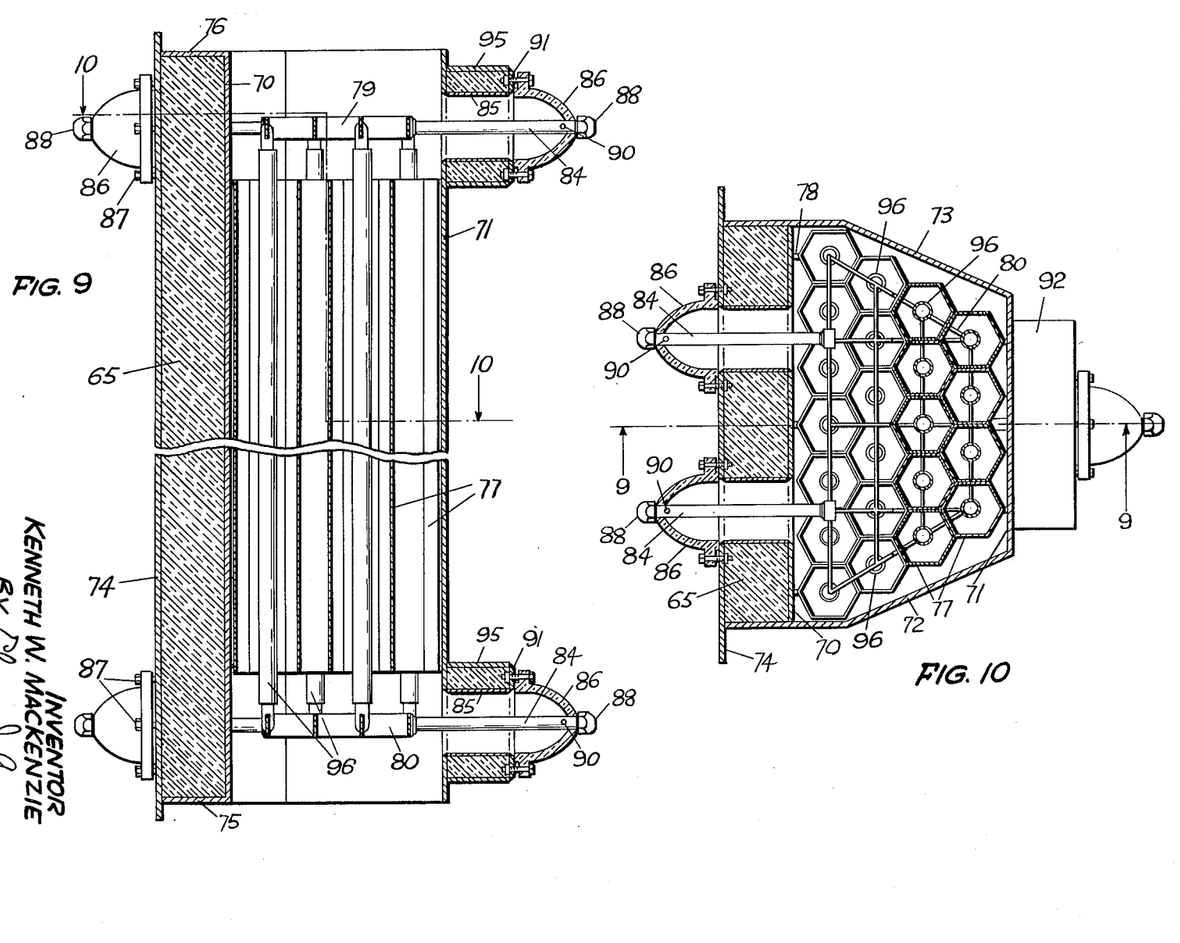
Fig. 9 is a longitudinal cross-sectional view of a section of the precipitating unit to collect charged particulate matter in the gaseous medium taken along line 9—9 of Fig. 10.
Fig. 10 is a transverse cross-sectional view of the collecting section shown in Fig. 9 taken along line 10—10 of Fig. 9.

Referring now to Figs. 8 and 9, there is shown a tier section of a collecting unit. The container members and grid structure and insulating supports are all identical with that previously described for the ionizing tier section, the length of the tier sections being varied, if desired, and, in a particular case shown in Fig. 1, the collecting tier sections are somewhat longer than the ionizer tier sections.

In place of the ionizer wires 81 of the ionizer tier section, there have been substituted rods 96 connected to the grid support members 79 and 80 in such a way to allow for thermal expansion of the rods 96. The details of this are more completely described in the aforementioned copending application.

Figures 11, 12:
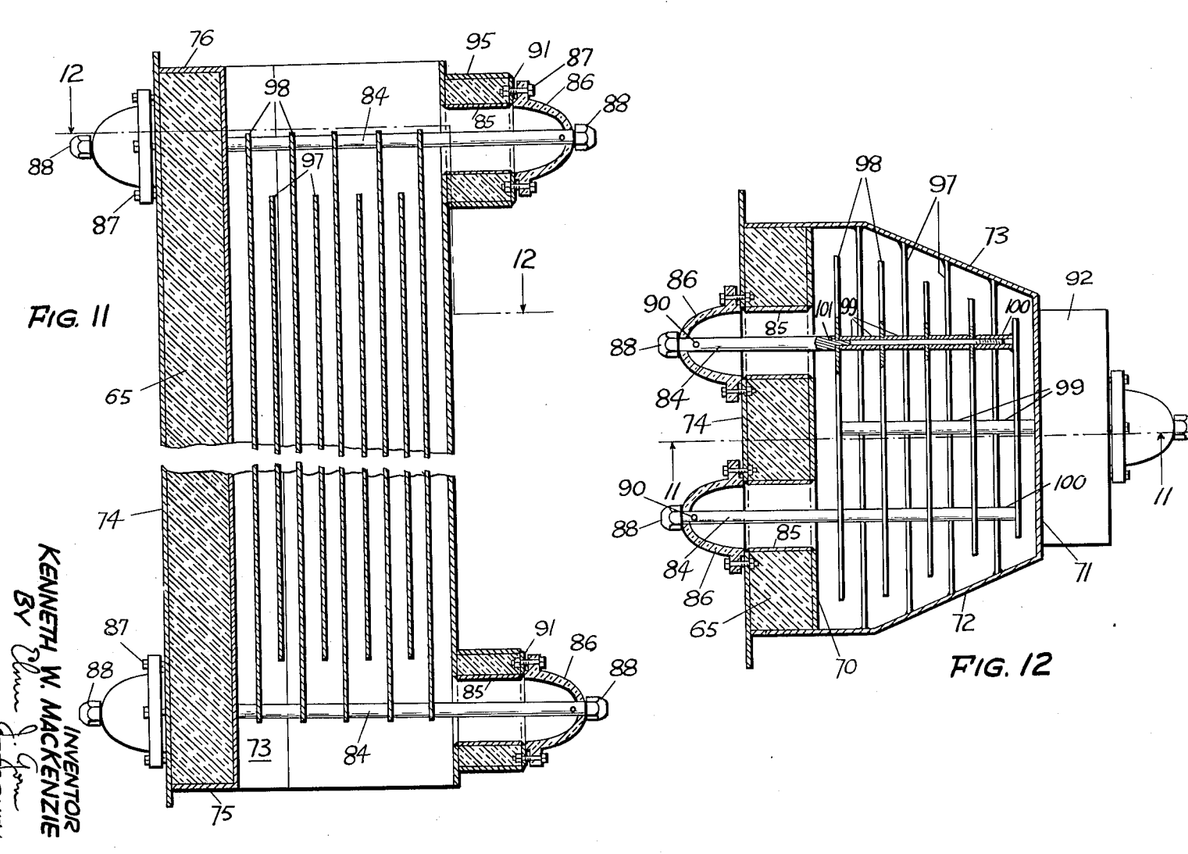
Fig. 11 is a partially broken away longitudinal cross-sectional view of another species of the collector section shown in Figs. 9 and 10 taken along line 11—11 of Fig. 12.
Fig. 12 is a transverse cross-sectional view of the species shown in Fig. 11 taken along line 12—12 of Fig. 11.

Referring now to Figs. 11 and 12, there is shown a modification of the tier sections which may be used for either ionizing or collecting purposes. The container structure and insulating support means of the unit is identical with that described and illustrated with Figs. 7–10. However, the prismoidal elements 77 and their central conductors have been replaced by flat plates. To accomplish this, flat plates have been welded between the members 72 and 73 parallel to the members 70 and 71. These flat plates 97 extend longitudinally for a distance equal to that of the cylinders 77 in Figs. 7–10. The spacing between these plates is substantially equal to the largest cross-sectional dimension of the prisms 77 in Figs. 7–10 thereby dividing the trapezoidal space into a plurality of equal sections. Interleaved between plates 97 is a second set of plates 98 which are spaced from the members 72 and 73 by a distance somewhat greater than the distance between plates 97 and 98. Plates 98 extend longitudinally beyond the plates 97 and are rigidly attached to the bolts 84 in the following manner. The bolts 84 extend through holes in the plates 98, the diameter of said holes being just large enough to accommodate the bolts 84. The relative spacing between the plates 98 is maintained by spacing sleeves 99 slid over the bolt 84 and engaging the surfaces of the plates 98. The bolt 84 is attached to the plate 98 which is farthest from the insulating support 86 by being threaded into a sleeve 100 which is welded to said plate 98. The outside of the plate 98 closest to plate 86 engages a shoulder as at 101 on rod 84 thereby cooperating with threaded sleeve 100 to rigidly hold on the plates 98 in relative alignment. Rods 84 are rigidly attached by insulators 86 as previously described, and, by this means, plates 98 are rigidly and insulatedly supported a fixed distance from the plates 97.

In order for the ionizing and collecting operation to occur, a potential must be applied between the rods 84 and the outer container. Referring now to Figs. 3 and 4, there is shown a method of applying this potential. This potential which may be, for example, on the order of 15,000 to 30,000 volts is derived from any desired source (not shown) and fed to conducting fixed rings 103 surrounding the prism 22. As shown herein, there are two rings 103, one for feeding a potential to the ionizer section tiers and one for feeding potential to the collecting section tiers. By this method different voltages, if desired, may be applied to the ionizing and collecting units. However, if it were desired to apply the same potential to both collecting and ionizing units, one conducting ring 103 would be sufficient.

Each of the rings 103 is supported by a plurality of stand-off insulators 104 which are attached to a box frame 105 surrounding the prism 22 and which is attached by support members 106 to the uprights 26. Riding on each conducting ring 103 is a plurality of trolley wheels 107, one for each section of the precipitating cylinder. These wheels have their axes bearing in arms 108 which are rotatably attached to rods 109 connected to the rods 84 at the nuts 88. The arms 108 are resiliently biased by springs as at 110 such that the wheels 107 are placed in contact with the rails 103. The various tiers of each section are connected by jumping straps as at 111 connected to rods 84 at the nuts 88. Since the prism 22 is grounded, it may be seen that a potential is applied between the insulatedly supported conductors of the system and the grounded electrodes of the system.

In order to deenergize the sections 33 during the time that the section is being cleaned, the rail 103 is separated into two sections, the two sections being connected by insulating blocks 112. The section of the rail being contacted by the wheels when their respective sections are in the area, flue gas is maintained at the high operating potential, while the section contacted by the wheels during the period when the section is being cleaned is maintained at ground potential. Approximately one section, each side of the section being cleaned, is not in the area being exposed to the flue gas and it is in this section that the contacting wheels pass over the insulating blocks 112.

Figure 5:
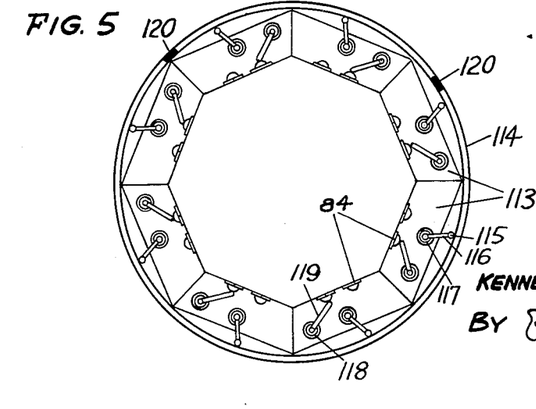
Fig. 5 illustrates diagrammatically another system for feeding potential to the precipitator unit from that disclosed in Figs. 3 and 4.
Figure 6:
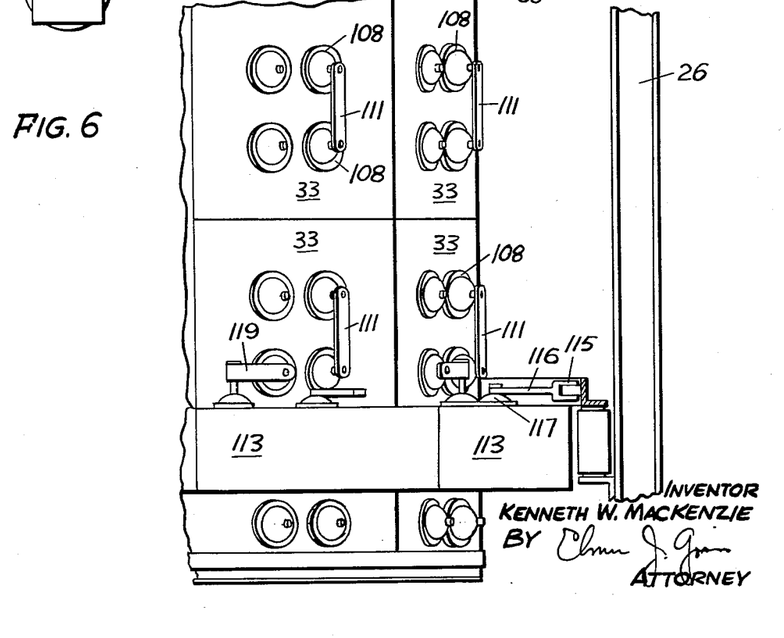
Fig. 6 is a portion of a front elevation view of the system shown in Fig. 5 illustrating the details of the electrical connections.

Referring now to Figs. 5 and 6, there is shown diagrammatically a modification of the system for energizing the various sections. In this modification each of the sections 33 has a power supply 113 mounted thereon, these power supplies being fed by a low voltage, for example, 220 volts, by a variation of the previously described trolley system. This system comprises a rail 114 insulatedly supported in a manner similar to that previously described in connection with rail 103 in Figs. 3 and 4. Riding on rail 114 is a roller 115 mounted on a rod 116 resiliently pivotally mounted on an insulating support 117 mounted on a power supply 113. The power supply producing high voltage is then strapped from an output 118 on the power supply to the desired insulating rods 84 by straps 119. The rail 114 has therein the insulating blocks 120 similar to blocks 112 in rail 103 for deenergizing the power supplies during the time the section is being cleaned. Since a relatively low voltage contact occurs between the rail 114 and the roller 115, switching at 120 creates substantially less arcing, burning and pitting than does similar switching on the rail 103. Furthermore, since each section has its own separate power supply, failure of the power supply of any one section will not render the device entirely inoperative since that section may be blocked off and the rest of the unit used.

While there is described herein two methods of supplying high potential to a precipitator unit, it is to be clearly understood that any other desired method for supplying ionizing and collecting potentials to the various tiers may be employed. For example, each of the tier sections may be supplied by a high voltage contact rail and roller contact system of the type shown in Fig. 4. In this arrangement each contact rail could be fed from a separate power supply, and thus, if the electrodes of a section of one of the tiers should discharge across, thereby overloading the power supply of that particular tier, the remaining tiers would continue to function without interruption.

Also, it would be possible to mount the power supplies of each tier on the rotating precipitator unit, utilizing any desired type of cam actuated mechanical switching of the high voltage distribution of said power supplies to the various sections of each tier to deenergize the respective sections during their cleaning periods.

The removable units of the tier sections may be merely set in place and will there remain due to gravity since the prism 22 rotates at a very slow rate, for example, 2–3 R. P. M. However, if desired, the individual tier sections may be rigidly attached to prism 22, for example, by having the joints between the tiers covered by straps 121 held in place, for example, by screws 122 extending into the supporting rings 66.

This completes the description of particular embodiments of the invention illustrated herein. However, many modifications thereof will be apparent to persons skilled in the art and, therefore, applicant does not wish to be limited to the particular species described herein except as defined by the appended claims.

What is claimed is:

1. A system for precipitating particulate matter in gases comprising a movable precipitator having removable sections, each of said sections comprising a box having openings for the ingress and egress of gaseous media and containing therein a plurality of electrodes, the relative position of said electrodes being maintained by supports mounted on insulators, said insulators comprising a ceramic member attached to a metal member, said metal member having holes therein for directing a cooling medium against said ceramic member.

2. A system for precipitating particulate matter in gases comprising a prismatic rotatable precipitator, means for conducting gaseous media to be cleaned into and out of said precipitator, means for supplying a high potential to said precipitator sections comprising a high voltage power supply mounted on each section of said precipitator, and means for energizing said power supplies from a relatively low voltage source.

3. A system for precipitating particulate matter in gases comprising a prismatic sectional rotatable precipitator, said precipitator having ionizing and collecting means and means for conducting gaseous media to be cleaned into and out of said precipitator, means for supplying a high potential to said precipitator sections comprising a separate high voltage power supply for each section rigidly mounted on the support structure of each section of said precipitator, and means for energizing said power supplies from a relatively low voltage source.

4. A system for precipitating particulate matter in gases comprising a prismatic sectional rotatable precipitator, said precipitator having ionizing and collecting means and means for conducting gaseous media to be cleaned into and out of said precipitator, means for producing relative rotational movement between said ionizing and collecting means and said gaseous media conducting means, means for supplying a high potential to said precipitator sections comprising a separate high voltage power supply for each section rigidly mounted on the support structure of each section of said precipitator, and means for energizing said power supplies from a relatively low voltage source.

5. A system for precipitating particulate matter in gases comprising a prismatic sectional rotatable precipitator, said precipitator having ionizing and collecting means and means for conducting gaseous media to be cleaned into and out of said precipitator, means for producing relative rotational movement between said ionizing and collecting means and said gaseous media conducting means, means for supplying a high potential to said precipitator sections comprising a separate high voltage power supply for each section rigidly mounted on the support structure of each section of said precipitator, each section of said precipitator comprising a plurality of tiers, and means for energizing said power supplies from a relatively low voltage source.

6. A system for precipitating particulate matter in gases comprising a prismatic sectional rotatable precipitator, said precipitator having ionizing and collecting means and means for conducting gaseous media to be cleaned into and out of said precipitator, means for producing relative rotational movement between said ionizing and collecting means and said gaseous media conducting means, means for supplying a high potential to said precipitator sections comprising a separate high voltage power supply for each section rigidly mounted on the support structure of each section of said precipitator, means for energizing said power supplies from a relatively low voltage source, and switching means controlling the power input to said supplies.

References Cited in the file of this patent

UNITED STATES PATENTS

| | | |
|---|---|---|
| 1,252,104 | Gervin | Jan. 1, 1918 |
| 1,399,441 | Petersen | Dec. 6, 1921 |
| 1,412,248 | Laughlin | Apr. 11, 1922 |
| 1,468,043 | Steinberger | Sept. 18, 1923 |
| 1,654,212 | Deutsch | Dec. 27, 1927 |
| 1,730,250 | Smith | Oct. 1, 1929 |
| 2,061,045 | Ruder et al. | Nov. 17, 1936 |
| 2,422,564 | Pegg | June 17, 1947 |
| 2,443,780 | Wintermute | June 22, 1948 |
| 2,582,133 | Karlsson | Jan. 8, 1952 |

FOREIGN PATENTS

| | | |
|---|---|---|
| 713,691 | France | Aug. 17, 1931 |